United States Patent [19]

Goddard et al.

[11] Patent Number: 4,508,701

[45] Date of Patent: Apr. 2, 1985

[54] EXTRACTION OF TUNGSTEN FROM SPENT OR SCRAP CATALYST MATERIALS

[75] Inventors: John B. Goddard, Grand Island, N.Y.; William N. Johnson, Ridgefield, Conn.

[73] Assignee: Union Carbide Corporation, Danbury, Conn.

[21] Appl. No.: 480,735

[22] Filed: Mar. 31, 1983

[51] Int. Cl.$^3$ ............................................. C01G 41/00
[52] U.S. Cl. ...................................... 423/61; 423/54; 423/58
[58] Field of Search ............................ 423/53, 58, 61

[56] References Cited

U.S. PATENT DOCUMENTS

| | | | |
|---|---|---|---|
| 2,351,678 | 6/1944 | Hall | 423/61 |
| 3,158,438 | 11/1964 | Kurtak | 23/22 |
| 3,911,077 | 10/1975 | Martin et al. | 423/58 |
| 4,298,581 | 11/1981 | Douglas et al. | 423/58 |

*Primary Examiner*—Herbert T. Carter
*Attorney, Agent, or Firm*—John R. Doherty

[57] ABSTRACT

A spent or scrap tungsten-containing, aluminosilicate catalyst material is blended with a silicate-containing, tungsten-bearing ore concentrate in amounts such that at least about 2.0% by weight of the total tungsten values in the mixture are present in the catalyst material, and then digested with an alkaline solution, e.g., sodium carbonate, under pressure and at an elevated temperature for a period of time sufficient to extract substantially all of the tungsten values from the mixture components. The presence of the catalyst material substantially suppresses the dissolution of silica in the leach liquor.

18 Claims, No Drawings

EXTRACTION OF TUNGSTEN FROM SPENT OR SCRAP CATALYST MATERIALS

TECHNICAL FIELD

The present invention relates generally to the extraction of tungsten from tungsten-bearing materials. More particularly, the present invention relates to a process for extracting tungsten values from a mixture of silicate-containing, tungsten-bearing ore concentrate and a spent or scrap catalyst material.

BACKGROUND ART

It is generally known that tungsten values can be readily extracted from tungsten-bearing ores, such as scheelite, by leaching the ore concentrate under pressure with an alkaline solution, such as sodium carbonate, at an elevated temperature, typically about 200° C. It is also generally known that many tungsten-bearing ore concentrates contain relatively large amounts of silicates as impurities which readily dissolve in the alkaline leach solution.

For example, low-grade scheelite concentrates can be effectively leached with sodium carbonate solution under pressure to produce relatively high yields of tungsten values, e.g., about 98–99%. Typically, the leach solution will contain silica in amounts ranging from between about 1 to 3 grams per liter $SiO_2$ or more. As the solution cools and during subsequent processing, the silica tends to precipitate, causing some tungsten entrainment. Additional silica precipitation occurs upon acidification, a step required in the removal of molybdenum as $MoS_3$ and in the preparation of the solution for solvent extraction. Some silica is solvent extracted along with the tungsten and is stripped off the organic solvent, along with the tungsten, by aqueous ammonia. Silica precipitates from the strip solution, requiring filtration and causing some tungsten loss. Any silica remaining in the solution at this point accompanies the ammonium tungstate solution to the ammonium paratungstate crystallizer. The silica ties up some of the tungsten and can prevent its crystallization as APT. This requires the recycle of tungsten as mother liquor, thereby increasing the cost per unit of tungsten produced.

By "low-grade" scheelite concentrate as used hereinabove is meant any grade below a commercial grade of concentrate. Typically, these concentrates will contain between about 5 and 50% by weight $WO_3$.

Tungsten or molybdenum together with nickel or cobalt are commonly used as a catalyst in the hydrocracking of certain petroleum fractions to a more useful product. Generally, the metal catalyst components are present on a zeolite or aluminosilicate substrate. As the catalyst becomes loaded with sulfur, carbonaceous materials and impurity metals, the catalyst efficiency decreases gradually to the point where it is no longer usable from a practical standpoint. This "spent" material, however, still contains the original catalyst metals and becomes a valuable raw material, particularly for the recovery of tungsten.

Another similar source of tungsten is scrap from the original preparation of the catalyst, which for various reasons is unsuitable as catalyst itself. This "scrap" catalyst material generally is not contaminated with sulfur or carbonaceous compounds.

Various attempts have been made to extract tungsten values from spent or scrap catalyst by leaching the catalyst with an alkaline solution, e.g., sodium carbonate. However, these attempts resulted in relatively low yields of tungsten and accordingly they were not considered to be successful.

It has been unexpectedly found that the foregoing difficulties may be effectively avoided by mixing together both the silicate-containing, tungsten-bearing ore concentrate and the spent or scrap catalyst material in appropriate amounts and then leaching or digesting the mixture in an alkaline leach solution, e.g., sodium carbonate, under pressure and at an elevated temperature. The presence of the spent or scrap catalyst material greatly reduces the soluble silica and thus minimizes the subsequent processing problems described hereinabove. This is quite unexpected since the catalyst substrate itself contains significant amounts of silica. Furthermore, it has been surprisingly found that the alkaline pressure leach of the mixture results advantageously in the extraction of extremely high yields of tungsten values that are equal and, in some cases, superior to the yields obtained from the alkaline leach of the tungsten ore concentrate alone.

DISCLOSURE OF INVENTION

The present invention contemplates a process for extracting tungsten values from a silicate-containing, tungsten-bearing ore concentrate comprising:

(a) providing a finely-divided catalyst material having an aluminosilicate substrate and containing tungsten as an active catalyst metal;

(b) mixing the catalyst material together with finely-divided silicate-containing, tungsten-bearing ore concentrate in amounts such that at least about 2.0% by weight of the total tungsten values in the mixture are present in the catalyst material;

(c) digesting the mixture with an alkaline leach solution, e.g., sodium carbonate, under pressure and at an elevated temperature for a period of time sufficient to extract substantially all of the tungsten values from the mixture components, the presence of the catalyst material substantially suppressing the dissolution of silica in the leach liquor; and (d) filtering the leach liquor and recovering the substantially silica-free tungsten values from the resulting residue.

DETAILED DESCRIPTION

As indicated, the present invention is based upon the discovery that exceptionally high recoveries of tungsten values can be achieved by adding spent or scrap catalyst material in appropriate amounts to a silicate-containing, tungsten-bearing ore concentrate and then digesting the mixture in an alkaline leach solution, e.g., sodium carbonate, under pressure and at an elevated temperature. An important advantage of the present invention is that these exceptionally high recoveries of tungsten can be obtained along with significantly lower soluble silica levels than normally encountered when treating a tungsten-bearing ore concentrate alone. Typically, the soluble silica levels in the leach residue will be on the order of about 0.2 grams per liter. However, it should be noted that these low soluble silica levels are obtained in the practice of the present invention when the amount of tungsten that is present in the catalyst material is at least about 2.0% by weight of the total tungsten values in the mixture.

Although the present invention will be described herein with particular reference to the extraction of tungsten from scheelite ores (CaWO4), it will be understood that the principles of the invention should be applicable as well to other tungsten-bearing ore materials such as, for example, wolframite ores, a group of iron and manganese tungstates of the general formula (Fe,Mn)WO4. For the purposes of the present invention, the term "catalyst material" shall mean and include any tungsten-containing, aluminosilicate catalysts used particularly for hydrocracking of certain petroleum fractions in the petroleum industry. The catalyst material will contain predominately Al2O3 and SiO2 as the base or substrate. The catalyst will also contain tungsten or molybdenum along with nickel or cobalt as the active catalyst metals. Typically, the catalyst material wil contain from about 10 to 25% by weight WO3. In the case where a spent catalyst material is employed, the catalyst will generally also contain varying amounts of sulfur, carbonaceous materials and impurity metals. A scrap catalyst, however, will contain none of these additional compounds.

In the practice of the present invention, the spent catalyst material when used is preferably first calcined in air to burn off substantially all of the carbon and oxidize to the hexavalent state any reduced tungsten which may be present. Calcination also serves to oxidize any other reducing agents, such as sulfides, which may depress the tungsten extraction during the subsequent pressure digestion with the alkaline leach solution. Although most of the sulfur is removed during calcination, some sulfur will remain behind in its fully oxidized state, i.e., metal sulfates. If carbonaceous materials or other harmful reducing agents are not present, e.g., in the case of scrap catalysts which have never been used for hydroprocessing of crude oil, then calcination is not required.

The calcination step should be conducted at a temperature high enough to burn off carbon in a reasonable period of time. Generally, calcination temperatures in the range of 500° to 800° C. are preferred although higher temperatures may be used. If the calcination temperature is too high, however, certain tungsten compounds may be formed which are more difficult to leach. Calcination may be conducted by any suitable means such as by a rotary kiln.

Typical catalyst compositions are as follows:

|  | Calcined | Uncalcined |
|---|---|---|
| WO3 | 18.9 | 16.1 |
| SiO2 | 23.6 | 16.7 |
| Al2O3 | 26.8 | 20.4 |
| TiO2 | 7.5 | 6.0 |
| Ni | 7.4 | 5.4 |
| S | 2.1 | 4.9 |
| C | 0.3 | 2.3 |

After calcination, the spent catalyst (or uncalcined scrap catalyst if used) is reduced in size, preferably to about −200 mesh. Coarser sizes may be used but the tungsten extraction may decrease somewhat as a result. The catalyst material is then mixed with a silicate-containing scheelite ore concentrate, for example generally a low grade scheelite containing between 5 and 50% WO3. The scheelite ore concentrate is also reduced to a finely-divided state before mixing with the catalyst and preferably is about the same size as the catalyst material.

The catalyst-scheelite ore mixture is then leached in an alkaline solution, preferably sodium carbonate. The leach is carried out at elevated temperatures of about 200° C., for example, and under pressure generated by the system itself, e.g., about 225 psig, for a period of time sufficient to insure that the reaction has been completed. The amount of sodium carbonate to be used in the leach solution is related to a number of factors, including particularly the amount of tungstate that is present in both the scheelite and catalyst. As a general rule, the catalyst requires more Na2CO3 to carry out extraction to completion than does the scheelite ore. It has been found that the same Na2CO3/WO3 ratio, i.e., about 2 to 1, as heretofore used to leach the scheelite ore alone can be successfully employed to extract the tungsten values from the mixture of scheelite and catalyst according to the present invention, provided that no more than about 10% by weight of the total tungsten is present in the catalyst material. This particular feed weight ratio will generally achieve about 98–99% tungsten extraction from the mixture at a digestion temperature of about 200° C. for a digestion period of about 90 minutes.

The feed weight ratio will of course change when different digestion temperatures and times are employed. It has been found that substantially less Na2CO3 is required to achieve the same extraction if the mixture is digested at higher temperatures, e.g., 220°–230° C. The roughly 2:1 Na2CO3:WO3 weight ratio heretofore used is actually 4.37 times stoichiometric for the reaction:

$$CO_3^{2-} + CaWO_4 \rightarrow CaCO_3 + WO_4^{2-}$$

It should also be noted that when the catalyst supplies more than about 10% by weight of the total tungsten in the scheelite-catalyst mixture, e.g., about 25% by weight, then Na2CO3/WO3 ratios greater than about 2 to 1 are required under otherwise the same conditions in order to maintain the same high levels of extraction. Thus, different conditions utilized in the leach process will actually determine the required amount of Na2CO3 that must be employed.

Although sodium carbonate is the preferred leach solution as indicated, it is of course possible to employ other alkaline solutions in the leach process such as, for example, sodium hydroxide, potassium carbonate and potassium hydroxide. In the case where tungsten values are extracted from other tungsten-bearing ore concentrates, such as wolframite ores, the sodium hydroxide leach solution may in fact be preferred. The amount of soluble silica in the leach residues may be higher in those cases where sodium hydroxide is employed but a greater proportion of the silica in the ore without catalyst also dissolves with sodium hydroxide digestions in comparison to the less alkaline sodium carbonate digestions.

EXAMPLE

Several tests were carried out to illustrate the effectiveness of leaching scheelite-catalyst blends. Leaches were carried out with solutions of 150 grams/liter Na2CO3 added to give a Na2CO3/WO3 feed ratio of approximately 2.0. If higher Na2CO3/WO3 ratios were desired, additional Na2CO3 was added to the charge as a solid. The experiments thus were designed to give a leach liquor (before dilution by washing) of 75 g.WO3/liter if all the tungsten dissolved. Leaches were conducted for 90 minutes at 200° C. After cooling, filtering, and washing with a volume of water equal to the original leach solution volume, the leach-wash liquors were analyzed for $WO_3$ and $SiO_2$, and the oven-dried residues for $WO_3$, to determine the efficiency of the process. The feed materials to the digester are described in Table I. Results of digestion tests are given in Table II.

Tests 1 and 2 show that the digestion of scheelite concentrate alone under the specified conditions leads to tungsten extractions of about 99%. It is generally known that less $Na_2CO_3$ is required if the digestion temperature or time are increased. The silica level in solution is of the order of 1-2 grams/liter. If essentially the same conditions are used to treat calcined spent catalyst by itself, the tungsten recovery is much lower and unsatisfactory. This is shown in Test 3. The silica level in solution is however very low. The same is true for treating an uncalcined scrap catalyst as shown in Test 4.

Tests 5 and 7 show that digesting calcined spent catalyst, in an amount supplying 10% of the total $WO_3$ in the mix, with scheelite will yield extractions in the 99% range with the same $Na_2CO_3/WO_3$ ratio of 2.0. The soluble silica was reduced by a factor of 5-8 in comparison to that of the scheelite-only digestions. Additions of catalyst to supply 25% of the total $WO_3$ decreased the tungsten extraction slightly as shown in Tests 6 and 8. However, the soluble silica decreased to very low levels, e.g., 0.02 grams/liter $SiO_2$. Tests 9 and 10, with 26% of the $WO_3$ derived from calcined catalyst, confirm that adding more $Na_2CO_3$ (i.e., increasing the $Na_2CO_3/WO_3$ feed ratio from 1.94 to 2.31) returns the extraction to the 99% level, yet the soluble silica remains at the 0.02 grams/liter level.

Tests 11-13 utilized uncalcined scrap catalyst in amounts from 11 to 26% of the total $WO_3$ feed. At the 11% level, the tungsten extraction is still about 99%, and the depression of soluble silica is also evident. Addition of 16 or 26% scrap ($WO_3$ basis) causes a loss in extraction with the $Na_2CO_3/WO_3$ feed weight ratio held at 1.93-1.95, although the soluble silica decreases further. It is evident that these scrap-scheelite blends require more sodium carbonate when the blends contain more than about 11% of the tungsten as scrap. The scrap sample contained only about half the tungsten as the spent catalyst samples, and hence more scrap catalyst than spent catalyst was required to make up the same scheelite-catalyst blends on a $WO_3$ basis. More $Na_2CO_3$ may be required because of the greater amount of gangue material.

Tests 14 and 15 were performed with blends of scheelite and uncalcined spent catalyst, which contains organic material. When related to Tests 5-8 with calcined scrap catalyst, the results indicate that significantly poorer yields are expected when the uncalcined spent catalyst blends are used.

TABLE 1

| Feed | Calcination Temp. (°C.) | Calcination Time (Hr) | Analysis (% by wt.) $WO_3$ | C | S | $SiO_2$ | Size (Mesh) |
|---|---|---|---|---|---|---|---|
| Scheelite A | uncalcined | | 13.61 | — | — | 6.15 | −200 |
| Scheelite B | uncalcined | | 12.46 | — | — | 6.15 | −200 |
| Spent Catalyst A | 565 | several | 18.91 | 0.30 | 2.06 | 23.6 | −200 |
| Spent Catalyst C | 500 | 4 | 23.11 | 0.16 | 1.84 | — | −200 |
| Spent Catalyst D | 800 | 4 | 23.30 | 0.007 | 0.022 | — | −200 |
| Spent Catalyst E | 600 | 4 | 22.04 | 0.002 | 0.29 | — | −200 |
| Spent Catalyst G | uncalcined | | 21.54 | 1.78 | 6.19 | — | −200 |
| Scrap Catalyst B | uncalcined | | 15.08 | 1.73* | 0.03 | 21.9 | −100 |
| Scrap Catalyst F | uncalcined | | 10.96 | 1.46* | 0.03 | 16.4 | −200 |

*Present as carbonate.

TABLE II

SODIUM CARBONATE DIGESTION TESTS (90 Min., 200° C.)

| Test | Catalyst | Scheelite | Digester Feed % $WO_3$ As Catalyst | $Na_2CO_3/WO_3$ Wt. Ratio | Filtrate-Wash Soln. g/L $WO_3$ | g/L $SiO_2$ | Digester Tails % $WO_3$ | Total % $WO_3$ Extd. |
|---|---|---|---|---|---|---|---|---|
| 1 | — | A | 0 | 1.96 | 38.7 | 1.61 | 0.20 | 98.6 |
| 2 | — | A | 0 | 1.96 | 40.9 | 0.90 | 0.04 | 99.8 |
| 3 | Spent A | — | 100 | 1.96 | 31.2 | 0.06 | 6.30 | 68.7 |
| 4 | Scrap B | — | 100 | 1.90 | 33.0 | 0.02 | 7.78 | 53.8 |
| 5 | Spent C | B | 10 | 1.98 | 42.3 | 0.22 | 0.09 | 99.4 |
| 6 | Spent C | B | 25 | 1.98 | 42.6 | 0.02 | 0.24 | 98.5 |
| 7 | Spent D | B | 10 | 1.98 | 44.4 | 0.19 | 0.10 | 99.4 |
| 8 | Spent D | B | 25 | 1.98 | 44.6 | 0.02 | 0.42 | 97.4 |
| 9 | Spent E | A | 26 | 1.94 | 42.2 | 0.01 | 0.42 | 97.6 |
| 10 | Spent E | A | 26 | 2.31 | 43.0 | 0.02 | 0.11 | 99.4 |
| 11 | Scrap F | A | 11 | 1.95 | 42.5 | 0.12 | 0.17 | 98.9 |
| 12 | Scrap F | A | 16 | 1.94 | 41.8 | 0.07 | 0.59 | 96.3 |
| 13 | Scrap F | A | 26 | 1.93 | 33.0 | 0.05 | 3.23 | 79.1 |
| 14 | Spent G* | B | 10 | 1.98 | 41.7 | 0.09 | 0.55 | 96.3 |
| 15 | Spent G* | B | 25 | 1.98 | 40.6 | 0.03 | 1.48 | 90.5 |

*Uncalcined
All percents are by weight
g/L = grams per liter

The process of the present invention can be carried out in the practice of conventional extraction techniques which incorporate the alkaline pressure leaching of tungsten ore concentrates. The initial presence of catalyst in the digester feed mix does not interfere with subsequent processing of the sodium tungstate solution.

In a typical extraction process, the leach slurry is filtered and the residue rinsed. A soluble sulfide, e.g., NaHS, is added in stoichiometric excess for the reaction:

$$MoO_4^{2-} + 4HS^- = MoS_4^{2-} + 4OH^-$$

After formation of the thiomolybdate complex, the solution is acidified with $H_2SO_4$ to about pH 3 to precipitate $MoS_3$ according to the reaction:

$$MoS_4^{2-} + 2H^+ = MoS_{3(s)} + H_2S$$

The molybdenum trisulfide is filtered off and the molybdenum-free tungstate solution is subjected to amine solvent extraction. The extracted tungstate is stripped from the organic solvent with aqueous ammonia. The aqueous ammonium tungstate solution normally is digested at about 50° C. for about 2 hrs. to cause the precipitation of some of the silica which was coextracted as a tungstosilicate complex. This is then filtered off. Some tungsten is lost by entrainment. With the initial use of catalyst in the sodium carbonate digestion step, the amount of soluble silica is minimized. At the point of treating the ammonium tungstate strip solution, the amount of silica may be low enough so that no silica removal step is necessary at this point. In any case, the amount of silica precipitate will be reduced, minimizing the filtration capacity requirements. The ammonium tungstate solution, after the silica removal step, is then fed to an evaporative crystallizer where pure ammonium paratungstate (APT) is produced. The yield of ammonium paratungstate increases as the amount of soluble silica decreases, because any remaining tungstosilicate remains soluble and does not convert to APT. This tungsten is not lost, but must be recycled, e.g., by treating the APT mother liquor with $Ca(OH)_2$ to precipitate $CaWO_4$. This is recycled to the digestion process. The amount of tungsten recycling thus increases with the amount of silica remaining in the APT crystallizer feed solution.

We claim:

1. A process for extracting tungsten values from a silicate-containing, tungsten-bearing ore concentrate comprising:
   (a) providing a finally-divided catalyst material containing predominantly $Al_2O_3$ and $SiO_2$ and from about 10 to 25% by weight $WO_3$;
   (b) mixing said catalyst material together with finely-divided silicate-containing, tungsten-bearing ore concentrate in amounts such that at least about 2.0% by weight of the total tungsten values in the mixture are present in said catalyst material;
   (c) digesting said mixture in an alkaline leach solution containing a material selected from the group consisting of sodium carbonate, sodium hydroxide, potassium carbonate and potassium hydroxide under pressure generated by the leach reaction and at an elevated temperature of at least about 200° C. for a period of time sufficient to extract substantially all of said tungsten values from the mixture components, the presence of said catalyst material substantially suppressing the dissolution of silica in the latch liquor; and
   (d) filtering said leach liquor and recovering the substantially silica-free tungsten values from the resulting residue.

2. A process according to claim 1 wherein the silicate-containing, tungsten-bearing ore is scheelite.

3. A process according to claim 2 wherein the catalyst material is a scrap catalyst.

4. A process according to claim 3 wherein the alkaline leach solution contains predominantly $Na_2CO_3$.

5. A process according to claim 4 wherein the amount of tungsten values in said catalyst material is equal to or less than about 10% of the total tungsten values in said mixture and wherein the weight ratio of $Na_2CO_3$ to $WO_3$ is approximately 2 to 1.

6. A process according to claim 5 wherein the mixture is digested at a temperature of about 200° C. for about 90 minutes.

7. A process according to claim 4 wherein the amount of tungsten values in said catalyst material exceeds about 10% of the total tungsten values in said mixture and wherein the weight ratio of $Na_2CO_3$ to $WO_3$ is greater than about 2 to 1.

8. A process according to claim 7 wherein the mixture is digested at a temperature of about 200° C. for about 90 minutes.

9. A process according to claim 2 wherein the catalyst material is a spent catalyst containing sulfur, carbonaceous material and impurity metals.

10. A process according to claim 9 wherein the spent catalyst is calcined at a temperature of between about 500° and 800° C. before mixing said catalyst with said tungsten ore concentrate.

11. A process according to claim 10 wherein the alkaline leach solution contains predominantly $Na_2CO_3$.

12. A process according to claim 11 wherein the amount of tungsten values in said catalyst material is equal to or less than about 10% of the total tungsten values in said mixture and wherein the weight ratio of $Na_2CO_3$ to $WO_3$ is approximately 2 to 1.

13. A process according to claim 12 wherein the mixture is digested at a temperature of about 200° C. for about 90 minutes.

14. A process according to claim 11 wherein the amount of tungsten values in said catalyst mixture exceeds about 10% of the total tungsten values in said mixture and wherein the weight ratio of $Na_2CO_3$ to $WO_3$ is greater than about 2 to 1.

15. A process according to claim 14 wherein the mixture is digested at a temperature of about 200° C. for about 90 minutes.

16. A process according to claim 2 wherein the catalyst material and the scheelite ore concentrate are reduced to a particle size of about $-200$ mesh.

17. A process for extracting tungsten values from a silicate-containing, tungsten-bearing ore concentrate comprising:
   (a) providing a finely-divided catalyst material containing predominantly $Al_2O_3$ and $SiO_2$ and from about 10 to 25% by weight $WO_3$;
   (b) mixing said catalyst material together with finely-divided silicate-containing, tungsten-bearing ore concentrate in amounts such that at least about 2.0% by weight of the total tungsten values in the mixture are present in said catalyst material;
   (c) digesting said mixture in a sodium carbonate solution under pressure generated by the leaching reaction and at an elevated temperature of from about 200° to 230° C. for a period of time sufficient to extract substantially all of said tungsten values from the mixture components, the presence of said catalyst material substantially suppressing the dissolution of silica in the leach liquor; and (d) filtering said leach liquor and recovering the substantially silica-free tungsten values from the resulting residue.

18. A process for extracting tungsten values from a silicate-containing, tungsten-bearing ore concentrate comprising:

(a) providing a finely-divided catalyst material containing predominantly $Al_2O_3$ and $SiO_2$ and from about 10 to 25% by weight $WO_3$;

(b) mixing said catalyst material together with finely-divided silicate-containing, tungsten-bearing ore concentrate in amounts such that from about 2.0 to about 10.0% by weight of the total tungsten values in the mixture are present in said catalyst material;

(c) digesting said mixture in a leach solution containing sodium carbonate in an amount such that the weight ratio of $Na_2CO_3$ to $WO_3$ is approximately 2 to 1, under a pressure of about 225 psig and at an elevated temperature of about 200° C. for a period of about 90 minutes to extract substantially all of said tungsten values from the mixture components, the presence of said catalyst material substantially suppressing the dissolution of silica in the leach liquor; and (d) filtering said leach liquor and recovering the substantially silica-free tungsten values from the resulting residue.

* * * * *

UNITED STATES PATENT AND TRADEMARK OFFICE
CERTIFICATE OF CORRECTION

PATENT NO. : 4,508,701
DATED : April 2, 1985
INVENTOR(S) : John B. Goddard; William N. Johnson It is certified that error appears in the above-identified patent and that said Letters Patent is hereby corrected as shown below:

Column 7, line 65, the word "latch" should read -- leach --

Signed and Sealed this

Sixteenth Day of July 1985

[SEAL]

Attest:

DONALD J. QUIGG

Attesting Officer   Acting Commissioner of Patents and Trademarks